(12) United States Patent
Villarreal et al.

(10) Patent No.: US 8,915,312 B2
(45) Date of Patent: Dec. 23, 2014

(54) DRILL MOTOR ENHANCEMENT PROVIDING IMPROVED SEALING PERFORMANCE AND LONGEVITY

(75) Inventors: Gilbert Villarreal, The Woodlands, TX (US); Allen Richard Young, Houston, TX (US)

(73) Assignee: Multishot LLC, Conroe, TX (US)

( * ) Notice: Subject to any disclaimer, the term of this patent is extended or adjusted under 35 U.S.C. 154(b) by 739 days.

(21) Appl. No.: 12/757,692

(22) Filed: Apr. 9, 2010

(65) Prior Publication Data
US 2011/0088952 A1 Apr. 21, 2011

Related U.S. Application Data

(63) Continuation-in-part of application No. 12/603,417, filed on Oct. 21, 2009, now abandoned.

(51) Int. Cl.
*E21B 4/02* (2006.01)
*E21B 47/12* (2012.01)
*E21B 4/00* (2006.01)

(52) U.S. Cl.
CPC ............... *E21B 47/124* (2013.01); *E21B 4/003* (2013.01)
USPC .............................. 175/101; 175/107; 384/97

(58) Field of Classification Search
USPC .................... 175/107, 101; 384/97
See application file for complete search history.

(56) References Cited

U.S. PATENT DOCUMENTS

| | | | | |
|---|---|---|---|---|
| 3,982,859 A | * | 9/1976 | Tschirky et al. | 418/48 |
| 4,620,601 A | * | 11/1986 | Nagel | 175/107 |
| 4,683,964 A | * | 8/1987 | Wenzel | 175/107 |
| 5,217,080 A | * | 6/1993 | Wenzel et al. | 175/107 |
| 5,248,204 A | * | 9/1993 | Livingston et al. | 384/97 |
| 5,377,771 A | * | 1/1995 | Wenzel | 175/107 |
| 5,817,937 A | * | 10/1998 | Beshoory et al. | 73/152.46 |
| 6,244,361 B1 | * | 6/2001 | Comeau et al. | 175/61 |
| 6,250,806 B1 | * | 6/2001 | Beshoory | 384/97 |
| 6,416,225 B1 | * | 7/2002 | Cioceanu et al. | 384/97 |
| 6,561,290 B2 | * | 5/2003 | Blair et al. | 175/107 |
| 6,827,160 B2 | * | 12/2004 | Blair et al. | 175/107 |
| 2007/0071373 A1 | * | 3/2007 | Wenzel | 384/97 |
| 2011/0147091 A1 | * | 6/2011 | Bullin | 175/107 |

OTHER PUBLICATIONS

Chamber. (n.d.). Dictionary.com Unabridged. Retrieved Mar. 19, 2014, from Dictionary.com website: http://dictionary.reference.com/browse/Chamber.*

* cited by examiner

*Primary Examiner* — Robert E Fuller
(74) *Attorney, Agent, or Firm* — Winstead PC

(57) ABSTRACT

Enhancements to a drill motor include a bearing pack assembly, a balancing piston, a recording transducer package (RTP), and a latch rod assembly for a drill motor to improve performance and reliability of a drill motor. The bearing pack assembly includes a bearing housing coupled to an end cap and a drive shaft extending into the end cap and the bearing housing. The bearing pack assembly also includes a thrust bearing disposed within the bearing housing, wherein the thrust bearing separates the drive shaft and the bearing housing, and a bearing sleeve disposed within the bearing housing, wherein a radial bearing is placed between the bearing sleeve and the drive shaft. The balancing piston includes a first and second hydrodynamic seal. The recording transducer package is self powered and gathers data from a plurality of sensors in the downhole tool. The latch rod assembly include a latch head is coupled to the rotor of a drill motor, wherein the latch head is larger than the opening in the bottom end of a top sub.

4 Claims, 5 Drawing Sheets

DRILL MOTOR ENHANCEMENT PROVIDING IMPROVED SEALING PERFORMANCE AND LONGEVITY

TECHNICAL FIELD

The present invention relates in general to a drill motor and more specifically to enhancements to a drill motor to improve durability and performance.

BACKGROUND

A wellbore may be drilled utilizing a drilling string to recover fluids from an oil well or the like. A drilling string may include a drill motor, a drill bit, and several other components. In addition to a rotor and stator, a drill motor may include several moving components that are sensitive to the harsh environmental conditions that are encountered during drilling. The harsh environmental conditions encountered during drilling make it difficult to maintain and operate a reliable drill motor.

One of the frequent problems encountered by drilling motors is invasion of mud and other undesirable particles into critical components of the motor. The mud and undesirable particles may enter lubricated areas of the motor causing damage to sensitive components in these areas. Further, high loads created on components of the motor may deform or break these components. This not only damages those components, but may also allow mud and unwanted particles to enter into lubricated areas.

In order to improve the reliability of drill motors, it may be desirable to gather data to evaluate and improve drilling. Several sensors may be provided in a drill collar to measure properties in the wellbore during drilling or to perform measurement-while-drilling (MWD). These sensors may be powered by a power supply incorporated in the drill string. However, shock and vibration from drilling may damage the power supply for the sensors gathering data.

Another problem that may be encountered during drilling is when the drilling motor disconnects from the string. For example, "back off" may cause the drilling motor to unscrew from a top sub or the like. The drilling motor and a lower portion of the drill string connected below the drilling motor may be lost downhole when the drill motor disconnects from the string. In order to recover the drill motor and the lower portion of the drill string, the upper portion of the drill string is removed and specialized recovery tools are lowered into the borehole to retrieve the drill motor.

When these types of problems are encountered, the drilling string must be removed from the wellbore to repair damaged components of the drill motor or the string must be removed so that recovery tools utilized to retrieve lost components from the borehole can be lowered in. For example, when critical components of the motor or a power supply for MWD is damaged, the drill string is removed and the damaged components must be replaced. The removal and repair of the drilling string may take several hours or even days. Further, the repair cost and cost of downtime may be significant. Therefore, it is a desire to provide a improved drill motor that remedies these common problems encountered in drill motors.

SUMMARY

In view of the foregoing and other considerations, the present invention relates to improvements to a drill motor.

Accordingly, an embodiment provides a bearing pack assembly for a drill motor. The bearing pack assembly comprises a bearing housing threadedly coupled to an end cap, a drive shaft extending through the bearing housing, and a thrust bearing and a radial bearing disposed within the bearing housing, wherein the thrust bearing and radial bearing placed in between the drive shaft and bearing housing. The bearing pack assembly further comprises a bearing sleeve with a diameter slightly smaller than the bearing housing, wherein the radial bearing is positioned within the diameter of the bearing sleeve.

Yet another embodiment provides a balancing piston disposed between a drive shaft and a bearing housing. The balancing comprises a bushing press fit into the balancing piston, wherein the bushing is placed between a portion of the balancing piston and the drive shaft, a first hydrodynamic seal placed in a first groove defined by the balancing piston, wherein the first hydrodynamic seal is in contact with the drive shaft, a second hydrodynamic seal placed in a second groove defined by the balancing piston, wherein the second hydrodynamic seal is in contact with the drive shaft, and a wiper seal placed in a third groove defined by the balancing piston, wherein the wiper seal is in contact with the drive shaft.

Yet another embodiment provides a recording transducer package for a drill motor. The recording transducer package comprises a memory for storing drilling data gathered by a plurality of sensors in a downhole tool, and a processor coupled to the memory and the plurality of sensors, wherein the processor stores the data gathered by the plurality of sensors to the memory, the plurality of sensors are piezoelectric sensors providing power to the recording transducer package.

Yet another embodiment provides a drill motor comprising a stator with a rotor disposed within the stator, a top sub coupled to the stator, wherein a bottom end of the top sub is coupled to the stator, the bottom end provides a shoulder to reduce an opening in the bottom end of the top sub, a latch rod coupled to the rotor, wherein a first end of the latch rod is coupled to the rotor and the latch rod extends into the top sub, and a latch head coupled to a second end of the latch rod, wherein the latch head is larger than the opening in the bottom end of the top sub.

The foregoing has outlined some of the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

The foregoing and other features and aspects of the present invention will be best understood with reference to the following detailed description of a specific embodiment of the invention, when read in conjunction with the accompanying drawings, wherein.

DETAILED DESCRIPTION

Figure 1A:
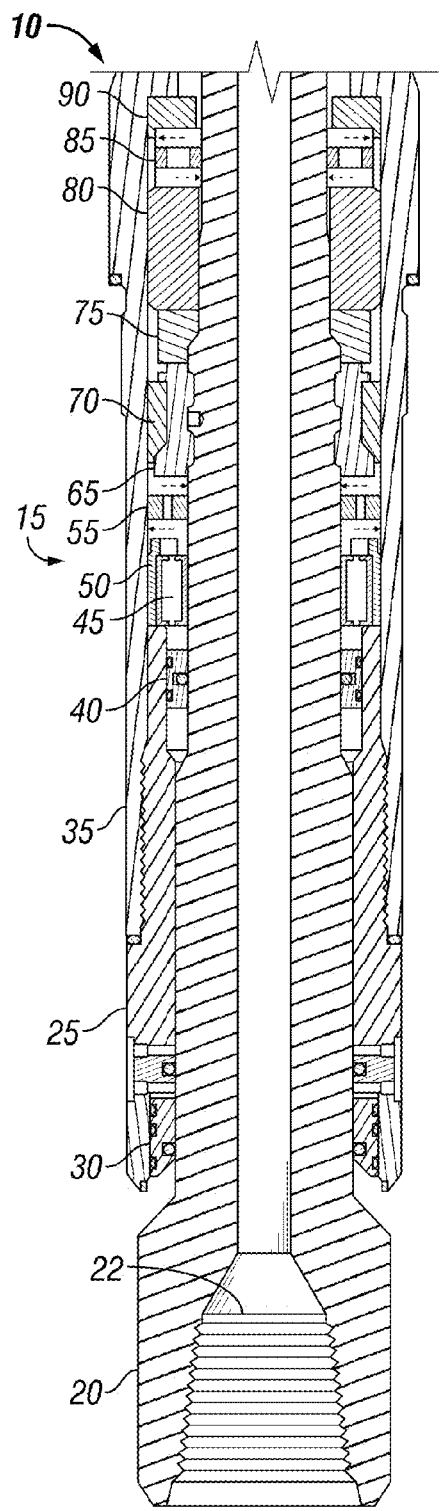
FIG. 1A is a lower portion of a drill motor including a bearing pack assembly.

Refer now to the drawings wherein depicted elements are not necessarily shown to scale and wherein like or similar elements are designated by the same reference numeral through the several views.

Drill motors for an oil or gas well may be powered by surface pumps driving drilling fluid that passes through the drill motor creating torque. The torque created causes a drill bit to rotate and drill a borehole. A drill motor may include the following four main subassemblies: a (1) Power Section, (2) CV Joint Assembly, (3) Adjustable Section and (4) Bearing Assembly. In particular, the improvements to a drill motor discussed herein may improve (1) lateral and axial stability of rotating members and (2) sealing mud and debris from invading areas where such solids will cause malfunction of the overall assembly. The modifications discussed herein may drastically improved the mean time between failure (MTBF) of drill motors.

As discussed herein, improvements to a drill motor incorporate an improved bearing assembly including a seal carrier, a radial bearing, a bearing sleeve, and a thrust bearing. An upper seal assembly for a drill motor may provide a balancing piston housing, a wiper seal, two hydrodynamic seals, a bushing, and a heavy duty polypack seal to reduce invasion of drilling mud and other particles. A self-powered recording transducer package (RTP) can be provided within the drill motor to record and measure drilling conditions in the well. Further, a latch head and latch rod assembly can be utilized to prevent the drill motor from being lost in the well if the drill motor separates from a top sub. These improvements are discussed herein with reference to the drawings.

FIG. 1A is a lower portion of a drill motor 10 including a bearing pack assembly 15. The lower or bottom portion of a drill motor 10 may provide a drive shaft 20 with a bottom end 22 adapted for receiving a drill bit. Drive shaft 20 may extend upward into the housing of drill motor 10. Because drive shaft 20 may rotate, several bearings, bushings, seals, and other additional components discussed herein may separate drive shaft 20 from other stationary components in drill motor 10. An end cap 25, including an end cap bushing 30, with an internal diameter large enough to house drive shaft 20 may be threadably coupled to a bearing housing 35. Similar to end cap 25, bearing housing 35 is a tubular structure providing protection to internal components of drill motor 10 (e.g. drive shaft, bearings, bushing, etc.).

During operation of drill motor 10, radial and axial loads may be exerted on components of drill motor 10. These loads may cause wear and tear, deformation, cracking, and other damage to the components of drill motor 10, which may allow mud and other undesired particles to invade critical areas and components of drill motor 10. A seal carrier 40 may be disposed between end cap 25 and drive shaft 20 to prevent mud and other undesirable particles from entering drill motor 10. Seal carrier 40 may house seals and/or O-rings, such as one or more hydrodynamic seals. For example, a popular hydrodynamic seal that is sometimes used in drill motors is a Kalsi Seal® manufactured by Kalsi Engineering, Inc. In one embodiment, two Kalsi Seals® are utilized by seal carrier 40. Seal carrier 40 may fluctuate up and down depending on pressure in the wellbore to prevent blow out of seals or the like.

A radial bearing 45 may be placed on drive shaft 20 to carry a radial load from drive shaft 20. In addition to radial bearing 45, a bearing sleeve 50 may be placed around radial bearing 45 separating bearing 45 from bearing housing 35. A thrust bearing 55 is provided in bearing housing 35 as well to carry an axial load. Bearing sleeve 50 stabilizes bearing housing 35 from radial loads and may prevent deformation of bearing 45 and 55. The combination of the radial bearing 45, bearing sleeve 50, and thrust bearing 55 in bearing housing 35 may prevent damage from axial and radial loads to components in bearing housing 35. Drill motor 10 may also include several additional components above bearing housing 35, such as a thrust bearing 55, a thrust ring 65, thrust ring retainer 70, rotating thrust plate 75, bearing spacer 80, thrust bearing 85, and a stationary thrust ring 90. These components secure drive shaft 20 into position and provide additional support for axial and radial loads.

Figure 1B:
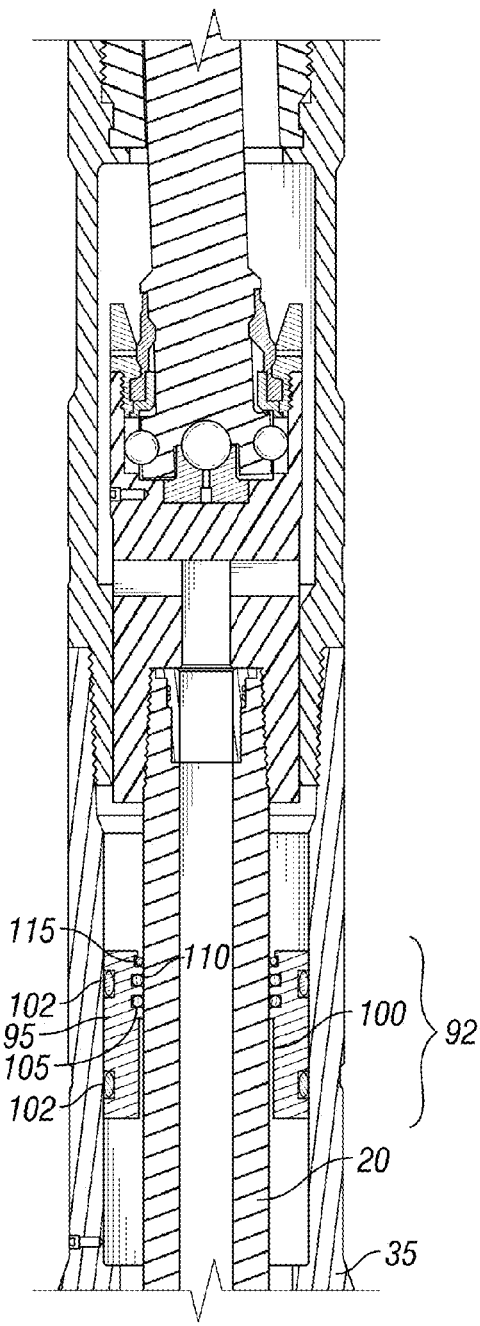
FIG. 1B is an upper portion of bearing housing including an upper seal assembly.

FIG. 1B is an upper portion of bearing housing 35 including an upper seal assembly 92. A balancing piston 95 may be provided between the upper portion of bearing housing 35 and drive shaft 20. Balancing piston 95 may float up and down depending on downhole pressure to prevent blow out of the upper seal assembly 92. A surface of balancing piston 95 facing drive shaft 20 may include bushing/bearing 100, such as a bushing/bearing provided by Garlock Sealing Technologies that is press fit into balancing piston 95. Grooves in balancing piston 95 facing bearing housing 35 may house seals 102, such as one or more heavy duty polypack seals. Additional grooves facing drive shaft 20 house a first 105 and second seal 110, such as one or more hydrodynamic seals (e.g. Kalsi Seals®). Another groove facing drive shaft 20 houses a wiper seal 115, which helps keep drilling mud and unwanted particles out when balancing piston 95 floats up and down. Lubricating fluid is provided between balancing piston 95 and seal carrier 40 to lubricate the bearings, drive shaft 20, and other components of drill motor 10 when drive shaft 20 is rotating. Seal carrier 40 and balancing piston 95, including the seals discussed, may reduce/prevent the amount drilling mud and other undesirable particles entering the lubricating fluid. This disclosed embodiment may increase motor life, e.g., from about 80-100 hrs to about 200-250 hrs.

Figure 2:
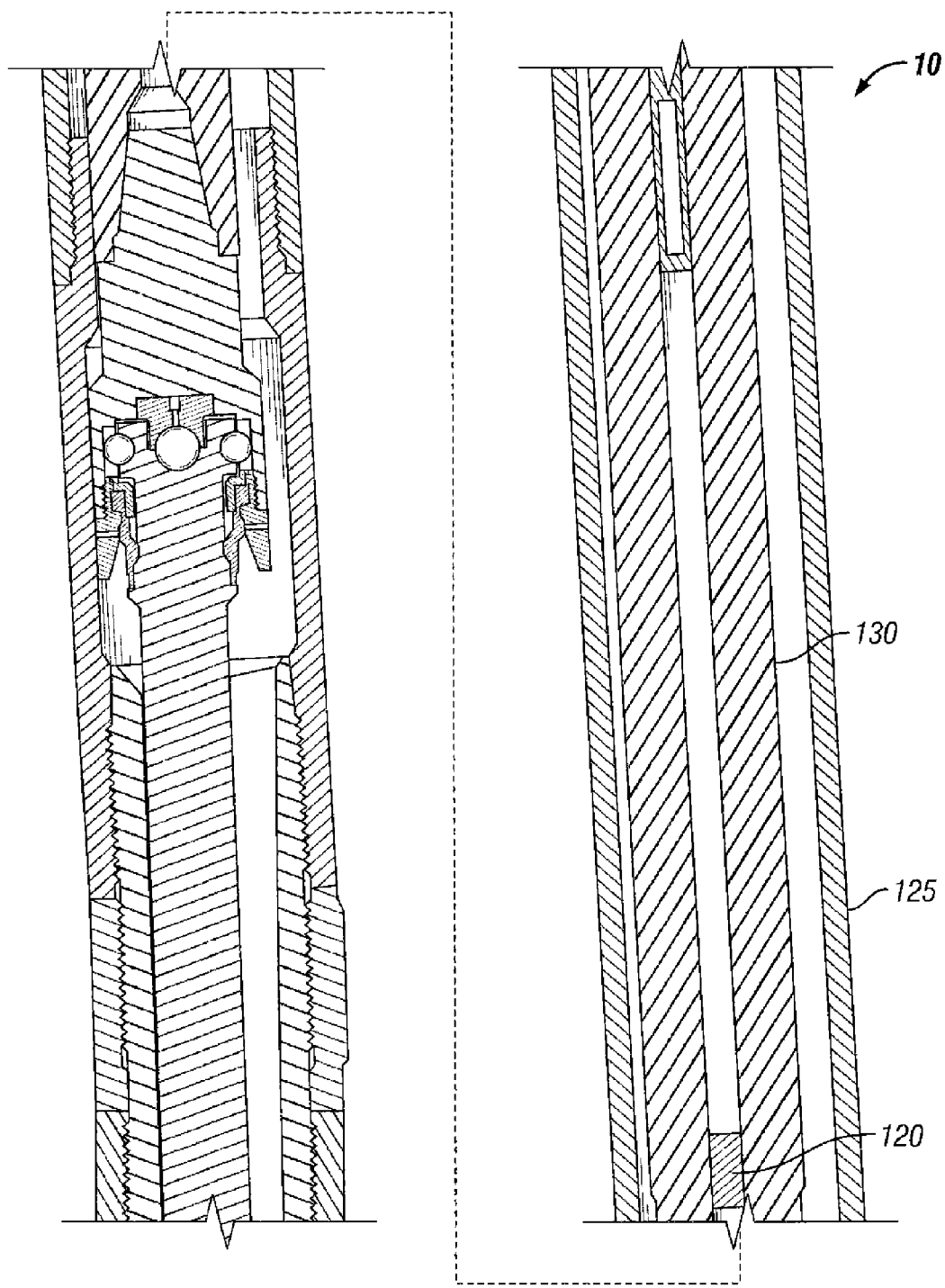
FIG. 2 is a middle portion of a drill motor providing a recording transducer package (RTP)

FIG. 2 is a middle portion of a drill motor 10 providing a recording transducer package (RTP) 120. Drill motor 10 may include stator 125, rotor 130 and latch rod 140. RTP 120 can be housed in a portion of rotor 130, latch rod 140, or any other suitable position in motor 10. RTP 120 may provide several sensors and/or be coupled to several sensors utilized to measure various conditions in the well and/or drill motor. For example, the sensors may measure axial shock, axial vibration, radial shock, radial acceleration, mud flow, temperature, and the like. The measurements provided by the sensors may be utilized to determined conditions in drill motor 10 and the wellbore. For example, axial shock, axial vibration, and radial shock (e.g. up to 50 g) readings provided by the sensors may indicate whether there is potential damage to bearings and other components of the motor. Further, the readings may be utilized to provide pre-failure signatures or warnings for drill motor 10. Radial acceleration and mud flow data can be utilized to determine how many hours the motor has been operated for. The number of hours of operation may be utilized to determine when maintenance is necessary. The data provided by the sensors may be utilized to evaluate and monitor performance. RTP 120 may also include a microcontroller or microprocessor, real time clock, and a storage media, such as a EEPROM, EPROM, flash memory, or any other type of suitable storage media. The real time clock may be utilized to date and time stamp the data gathered from the sensors, and the storage media may be utilized to store the gathered data and time stamps. In one embodiment, a transformer coupling or the like may be utilized to transfer the gathered data stored on the storage media to a retrieving device including a ROM or the like. The retrieving device may be attached to a pole, stick, cable, and/or the like to be lowered down into drill motor 10 or the wellbore to form a transformer coupling with RTP 120.

The sensors coupled to or provided by RTP 120 may be solid-state, piezoelectric, or a combination thereof. Piezoelectric sensors may generate electrical energy from mechanical stress applied to the sensor. If sufficient energy is generated from the piezoelectric sensors, no battery is needed in RTP 120. Solid-state sensors require a power source, such as a battery. The power source must be capable of withstanding the shock and movement that may be exerted on it during drilling operations. Conventional batteries may be damaged by this shock and movement that are exerted on them during drilling operations. In one embodiment, only piezoelectric sensors are utilized to power RTP 120. However, other embodiments may utilize an alternate or additional power source if needed or desired.

Figure 3:
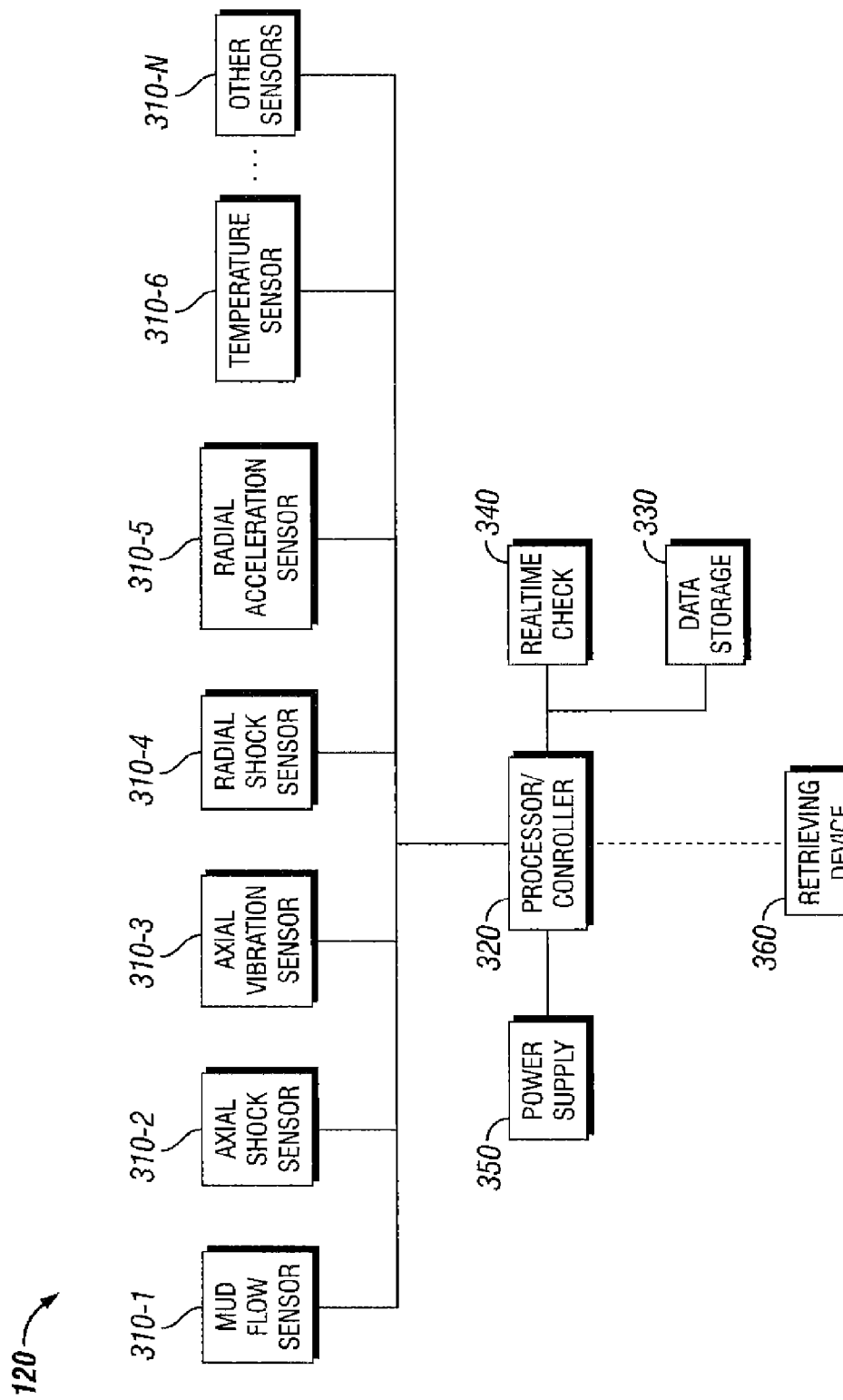
FIG. 3 illustrates one embodiment of a block diagram for Recording Transducer Package.

FIG. 3 illustrates one embodiment of a block diagram for RTP 120. RTP 120 includes a plurality of sensors, such as mud flow sensor 310-1, axial shock sensor 310-2, axial vibration sensor 310-3, radial shock sensor 310-4, radial acceleration sensor 310-5, temperature sensor 310-6, and any other suitable sensors 310-*n*. Sensors 310-1 to 310-*n* are coupled to a processor or controller 320. Data from sensors 310-1 to 310-*n* is gathered and stored to data storage 330. The data may be date and/or time stamped utilizing real time clock 340 prior to storage. RTP 120 may optionally include power supply 350 to provide power to components of RTP 120. In some embodiments, piezoelectric sensors may be utilized and power supply 350 is utilized to store power generated by sensors 310-1 to 310-*n*. In one embodiment, the piezoelectric sensors may generate enough power to eliminate the need for power supply 350. As indicated by the dotted line, RTP 120 is not physically coupled to retrieving device 360. Retrieving device 360 is lowered down near the drill motor next to RTP 120 to form a transformer coupling that allows data to be gathered by retrieving device 360 without physically coupling it to RTP 120.

Figure 4:
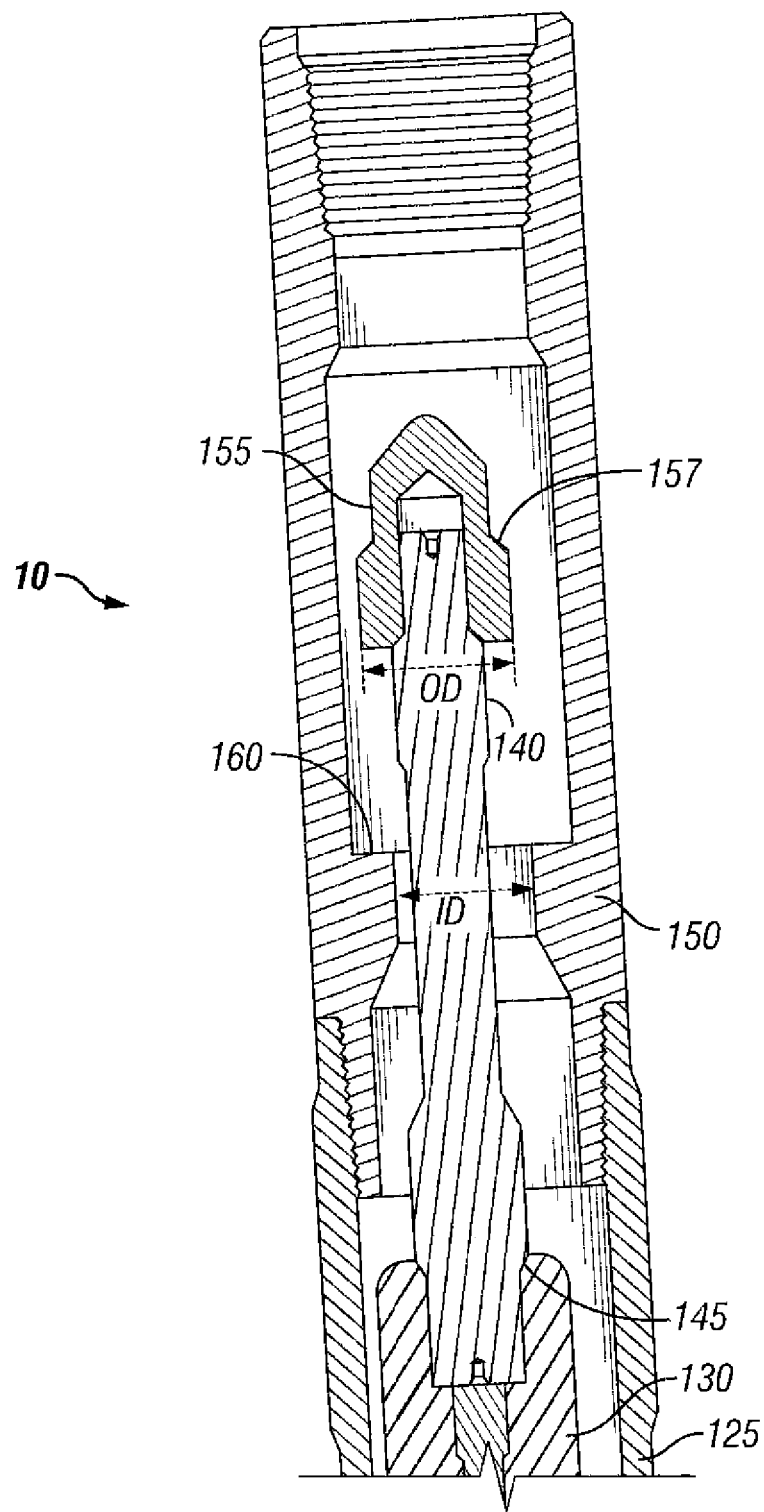
FIG. 4 is top portion of a drill motor 10 in a tool string.

FIG. 4 is a top portion of a drill motor 10 in a tool string. A stator 125 for drill motor 10 may be coupled to a top sub 150 in a drilling string. The outer diameter of a top portion of stator 125 may be increased to prevent cracking. For example, a 6¾ motor may have the outer diameter of stator 125 increased from 6¾" to 7". By only increasing the outer diameter of the top portion of stator 125, rather than increasing the outer diameter of the entire stator 125, flexibility in drill motor 10 is maintained. For example, if the build rate of 6¾ motor is 15°/100 ft, this modification may allow the 15°/100 ft build rate to be maintained, whereas increasing the entire stator 125 diameter to 7" might decrease the build rate to 10°/100 ft.

A latch rod 140 may be threadably coupled to rotor 130 of drill motor 10. Latch rod 140 is utilized to prevent drill motor 10 from being lost in the wellbore and to provide a fluid passage for drilling fluid utilized to rotate motor 10, which is discussed in detail below. Rotor 130 and latch rod 140 include beveled or mitered edges 145 near a coupling point between rotor 130 and latch rod 140. The beveled edges 145 provide a larger contact area between surfaces of rotor 130 and latch rod 140 than a straight shoulder, which increase the torque required to back off or the back out torque required to unscrew latch from 140 from rotor 130. In some embodiments, a seal lube may also be utilized on threaded coupling points and beveled edges to increase the back out torque required. In a preferred embodiment, the angle of beveled edges 145 is between 30-45° from horizontal; however, any suitable angle may be utilized for beveled edges 145. Latch rod 140 extends upward into top sub 150, and a top portion of latch rod 140 may be coupled to a latch head 155, which also provides a beveled or mitered edges 157. The lower part of top sub 150 includes shoulder 160. Shoulder 160 reduces the internal diameter (ID) of top sub 150. The internal diameter of top sub 150 is less than the outer diameter (OD) of latch head 155. If stator 125 of drill motor 10 backs off from top sub 150, latch head 155 is larger than the opening provided shoulder 160 of top sub 150. Latch head 155 will prevent drill motor 10 from being separated from top sub 150 and lost in the wellbore.

Figures 5A, 5B:
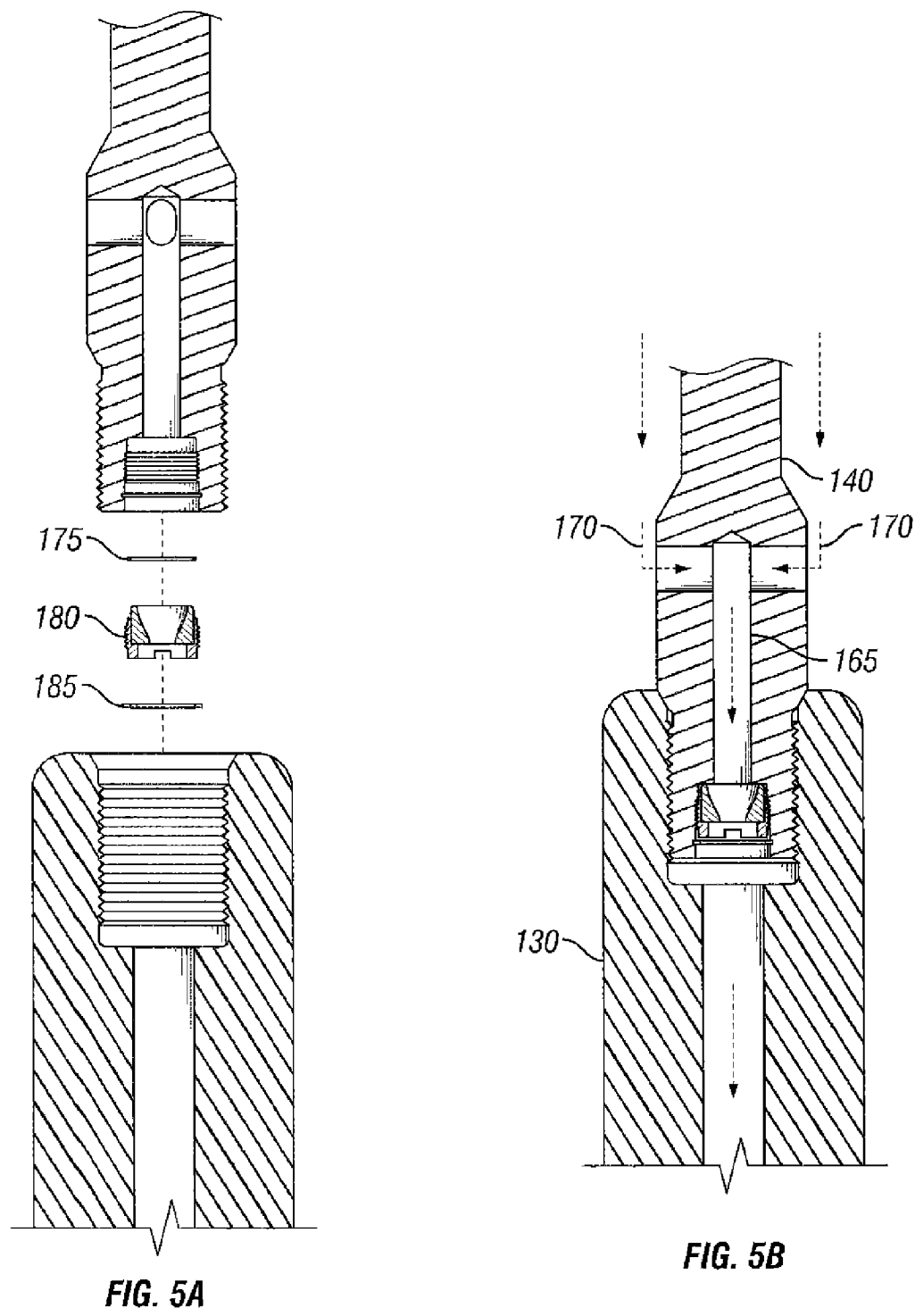
FIG. 5A is an exploded view of an embodiment of a latch rod providing a fluid bypass passage.
FIG. 5B is an assembled view of an embodiment of a latch rod providing a fluid bypass passage.

FIGS. 5A and B are an illustrative embodiment of a latch rod 140 providing a fluid bypass passage 165. Latch rod 140 provides one or more openings 170 leading to passage 165. In some embodiments, latch rod 140 may also house O-ring 175, jet nozzle 180, and retainer ring 185, which allows nozzle 180 to be provided in passage 165. As shown, drilling fluid can flow into openings 170 and into passage 165. The drilling fluid may pass through nozzle 180 into rotor 130.

The illustrative embodiments for a drill motor discussed herein may increase drill motor life, e.g., from 80-100 hrs to 200-250 hrs. These embodiments not only reduce or prevent unwanted from entering critical portions of a drill motor, but also increase the loads that the drill motor can handle. Additionally, these changes allow measurements gathered by sensors to be provided by a RTP that does not require batteries. Further, the improvements also prevents sections of a drilling string from being lost in the wellbore when a drilling motor backs off from a top sub.

From the foregoing detailed description of specific embodiments of the invention, it should be apparent that a system for improved drill motor that is novel has been disclosed. Although specific embodiments of the invention have been disclosed herein in some detail, this has been done solely for the purposes of describing various features and aspects of the invention, and is not intended to be limiting with respect to the scope of the invention. It is contemplated that various substitutions, alterations, and/or modifications, including but not limited to those implementation variations which may have been suggested herein, may be made to the disclosed embodiments without departing from the spirit and scope of the invention as defined by the appended claims which follow.

What is claimed is:

1. A drill motor system comprising:
 a seal carrier providing a seal between an end cap and a drive shaft, the seal carrier fluctuating up and down depending on pressure in a wellbore, wherein the seal carrier includes at least one seal to minimize the entry of unwanted particles, and the seal carrier defines a bottom portion of a lubrication fluid chamber;
 a bearing pack assembly for a drill motor, the bearing pack disposed in said lubrication fluid chamber, the bearing pack assembly comprising:
  a bearing housing coupled to an end cap;
  the drive shaft extending into the end cap and the bearing housing; and
  a bearing sleeve disposed within the bearing housing, wherein a radial bearing is placed between the bearing sleeve and the drive shaft;
 a balancing piston disposed between the drive shaft and the bearing housing, the balancing piston fluctuating up and down depending on pressure in the wellbore, wherein the balancing piston defines a top portion of said lubrication fluid chamber, and the balancing piston comprising:

a first hydrodynamic seal placed in a first groove defined by the balancing piston, wherein the first hydrodynamic seal is in contact with the drive shaft; and a second hydrodynamic seal placed in a second groove defined by the balancing piston, wherein the second hydrodynamic seal is in contact with the drive shaft;

a stator, wherein a rotor is disposed within the stator;

a top sub coupled to the stator, wherein a bottom end of the top sub is coupled to the stator, the bottom end provides a shoulder to reduce an opening in the bottom end of the top sub to a first internal diameter;

a latch rod coupled to the rotor, wherein the latch rod is solid without a central bore, a first end of the latch rod is coupled to the rotor and the latch rod extends into the top sub, and a second diameter of said latch rod is less than said first internal diameter of the top sub to allow unobstructed fluid flow between the shoulder of said top sub and said latch rod; and a latch head coupled to a second end of the latch rod, wherein a latch head diameter is larger than the first internal diameter in the bottom end of the top sub.

2. The drill motor system of claim 1, the balancing piston further comprising:

a bushing press fit into the balancing piston, wherein the bushing is placed between a portion of the balancing piston and the drive shaft; and a wiper seal placed in a third groove defined by the balancing piston, wherein the wiper seal is in contact with the drive shaft.

3. The drill motor system of claim 2, the balancing piston further comprising:

at least one heavy duty polypack seal, wherein the at least one heavy duty polypack seal is placed in at least one additional groove defined by the balancing piston that faces the bearing housing.

4. The drill motor system of claim 1, wherein the drill motor system includes a recording transducer package, the recording transducer package comprising:

a memory for storing drilling data gathered by a plurality of sensors in a downhole tool; and a processor coupled to the memory and the plurality of sensors, wherein the processor stores the data gathered by the plurality of sensors to the memory, the plurality of sensors are piezoelectric sensors that provide power to the recording transducer package.

* * * * *